UNITED STATES PATENT OFFICE.

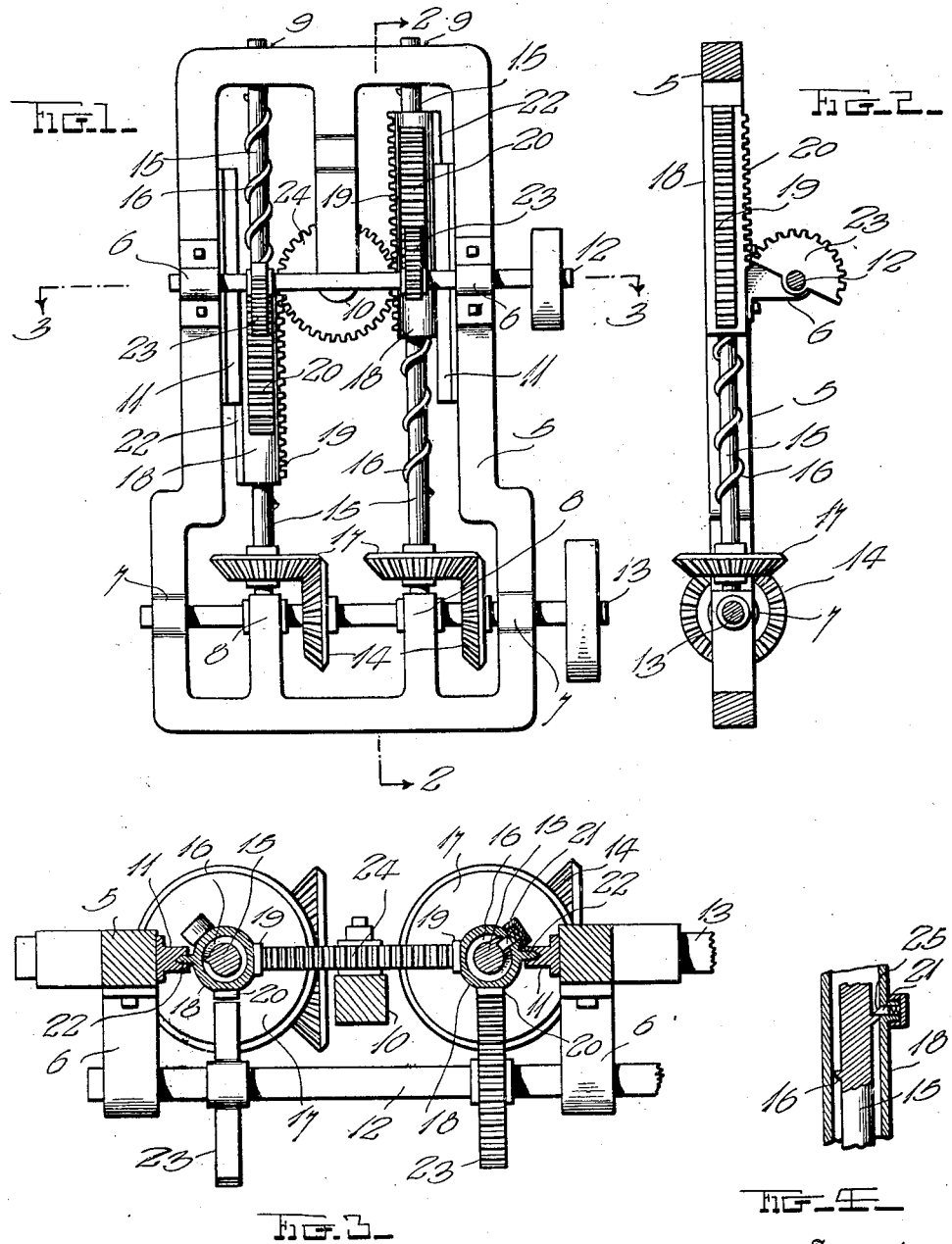

DANIEL WINEGARDEN, OF TULSA, OKLAHOMA.

MECHANICAL MOVEMENT.

1,359,304.

Specification of Letters Patent.

Patented Nov. 16, 1920.

Application filed September 15, 1919. Serial No. 323,759.

*To all whom it may concern:*

Be it known that I, DANIEL WINEGARDEN, a citizen of the United States, residing at Tulsa, in the county of Tulsa and State of Oklahoma, have invented certain new and useful Improvements in Mechanical Movements; and I do declare the following to be a full, clear, and exact description of the invention, such as will enable others skilled in the art to which it appertains to make and use the same.

This invention relates to mechanical movements.

One of the objects of this invention is to provide a strong, durable and compact device of comparatively simple construction that is useful as a power transmission mechanism in connection with bicycles, automobiles and various other machines;

Other objects and advantages may become apparent to persons who read the following details of description in connection with the accompanying drawings, in which:

Figure 1 is an elevation of my improved mechanical movement;

Fig. 2 is a sectional view along the line 2—2 of Fig. 1;

Fig. 3 is an enlarged sectional view along the line 3—3 of Fig. 1; and

Fig. 4 is an enlarged fragmental sectional detail view.

Referring to these drawings in detail, in which similar reference characters correspond with similar parts throughout the several views, the working parts, hereinafter described, are supported by a frame 5 which is provided with bearings 6, 7, 8, 9 and 10 and which is also provided with guides 11 at opposite sides of the frame.

A driving shaft 12 and a driven shaft 13 are rotatable in the bearings 6 and 7 respectively, and the transmission mechanism through the medium of which the shaft 12 drives the shaft 13 comprises a pair of gear wheels 14 fixedly mounted on the shaft 13, the latter being rotatable in the bearings 8; a pair of shafts 15 journaled in the bearings 8 and 9 and each provided with a helical element 16; a pair of gear wheels 17 each fixedly secured on one of the shafts 15 and meshing with one of the gear wheels 14; a pair of reciprocatory rack members 18 each comprising a series of rack teeth 19, a series of rack teeth 20, a spring pressed pawl 21 and a guide element 22; a pair of gear segments or mutilated gears 23 fixedly secured on the driving shaft 12 and adapted to be in and out of mesh with the racks 20; and a connecting member or gear wheel 24 which is continually in mesh with both racks 19 of the pair, this wheel being journaled in the bearing 10.

The reciprocatory elements 18 are movable longitudinally of the rods or worms 15 and are held against rotary movement by means of the guide elements 11 and 22, the rod being slidable in rectilinear grooves of the guides 11.

The operation of the device is as follows:

When the shaft 12 is rotated by means of a pulley or other actuating element, one of the gear segments 23 engages a corresponding reciprocatory element 18 and moves it along the corresponding shaft or worm 16, and during this movement the spring-pressed pawl 21 coöperates with the adjacent helical rib 16 so as to turn this shaft and the corresponding wheels 17 and 14, thereby rotating the driven shaft 13 in a predetermined direction. During this movement of the said reciprocatory element, the wheel 24 is rotated, and its rotation moves the other reciprocatory element in the opposite direction, this movement being permitted by reason of the mutilated or toothless portion of the corresponding gear 23 being toward the corresponding rack 20. When the second or upwardly moving element 18 has reached its uppermost position, the relation of the gear wheels 23 is changed so that the gear teeth of the uppermost members 18 are now engaged by the gear teeth on the corresponding segment 23 while the gear teeth of the lowermost element 18 are released from engagement with the corresponding element 23; and now the uppermost element 18 is moved downward, and its downward movement reverses the movement of the wheel 24 which, in turn, reverses the movement of the lowermost element 18. The foregoing operation is successively repeated so long as the driving shaft 12 continues to rotate, and the elements 13, 14, 15 and 17 are thereby continually rotated. In order to allow the elements 18 the ascending motion without affecting the movement of the shaft or worm 15, the pawls 21 are provided with inclined surfaces 25 which allow the elements 18 to pass over the helical ribs 16; but the pawls 21 do not slide over the helical ribs 16 during the downward movement of the elements 18, but slide along these ribs and cause them to turn the shafts 15.

Although I have described this embodiment of my invention very specifically, it is not intended to limit my invention to these exact details of construction and arrangement of parts, but I am entitled to make minor changes within the scope of the inventive idea disclosed in the foregoing description and following claims.

What I claim as my invention is:

1. A mechanical movement comprising a rotary driving shaft, a rotary driven shaft, a pair of gear wheels mounted on the driven shaft, a pair of gear wheels meshing with the first said pair, a pair of rotary shafts each carrying one of the gear wheels of the second said pair, helical elements on said pair of shafts, reciprocatory elements coöperative with said helical elements for effecting rotation of said pair of shafts, gear elements carried by said driving shaft and operable to move said reciprocatory elements in one direction, and means connecting said reciprocatory elements together in such relation that the movement of one of them in said direction effects movement of the other one of them in the opposite direction.

2. A mechanical movement comprising a rotary driving shaft, a rotary driven shaft, a pair of gear wheels fixedly mounted on the driven shaft, a pair of gear wheels meshing with the first said pair, a pair of rotary shafts each fixedly secured to one of the gear wheels of the second said pair, helical elements on said pair of shafts, reciprocatory elements, pawls carried by said reciprocatory elements and coöperative with said helical elements for effecting rotation of said pair of shafts, gear elements carried by said driving shaft and operable to move said reciprocatory elements in one direction, and means connecting said reciprocatory elements together in such relation that the movement of one of them in said direction effects movement of the other one of them in the opposite direction.

3. A mechanical movement comprising a rotary driving shaft, a rotary driven shaft, a pair of gear wheels mounted on the driven shaft, a pair of gear wheels meshing with the first said pair, a pair of rotary shafts each carrying one of the gear wheels of the second said pair, helical elements on said pair of shafts, reciprocatory elements each provided with two series of gear teeth and being movable along one of the shafts of said pair, and being coöperative with the adjacent helical element to effect rotation of the shaft along which it moves, mutilated gear wheels carried by said driving shaft, each of said mutilated gear wheels being adapted to be in and out of mesh with a corresponding one of the series of rack teeth of one of said reciprocatory elements, and a gear wheel continually in mesh with racks of said reciprocatory elements and being operable by each of said reciprocatory elements during its movement in one direction, for effecting movement of the other of said reciprocatory elements in the opposite direction.

In testimony whereof I have hereunto set my hand.

DANIEL WINEGARDEN.